US008892638B2

(12) United States Patent
Chang et al.

(10) Patent No.: US 8,892,638 B2
(45) Date of Patent: Nov. 18, 2014

(54) PREDICTING AND RETRIEVING DATA FOR PRELOADING ON CLIENT DEVICE

(75) Inventors: Jackie Chang, Taipei (TW); Sharlene Yuan, Taipei (TW); Buddha Wang, Taichung (TW); Esther Tsai, Taichung (TW); April Jiang, Taipei (TW)

(73) Assignee: Microsoft Corporation, Redmond, WA (US)

( * ) Notice: Subject to any disclaimer, the term of this patent is extended or adjusted under 35 U.S.C. 154(b) by 49 days.

(21) Appl. No.: 13/468,329

(22) Filed: May 10, 2012

(65) Prior Publication Data

US 2013/0304798 A1    Nov. 14, 2013

(51) Int. Cl.
*G06F 9/38*     (2006.01)
*G06F 15/16*    (2006.01)
*G06F 17/30*    (2006.01)

(52) U.S. Cl.
USPC ........................................................ 709/203

(58) Field of Classification Search
CPC ....... G06F 8/441; G06F 9/3802; G06F 15/16; G06F 17/30129; G06F 9/30047; G06F 17/30; G06F 17/30902; G06F 12/0875; H04L 29/0881; H04L 67/2847
See application file for complete search history.

(56) References Cited

U.S. PATENT DOCUMENTS

| | | | |
|---|---|---|---|
| 5,826,253 A * | 10/1998 | Bredenberg ........................... 1/1 |
| 6,003,115 A | 12/1999 | Spear et al. |
| 6,026,471 A | 2/2000 | Goodnow et al. |
| 6,098,064 A * | 8/2000 | Pirolli et al. ........................... 1/1 |
| 6,463,509 B1 * | 10/2002 | Teoman et al. ................ 711/137 |
| 8,131,665 B1 * | 3/2012 | Wolfe ............................ 707/602 |
| 8,280,414 B1 * | 10/2012 | Nourse et al. .................. 455/457 |
| 8,356,080 B2 * | 1/2013 | Luna et al. ..................... 709/216 |
| 2003/0187984 A1 | 10/2003 | Banavar et al. |
| 2004/0080771 A1 * | 4/2004 | Mihira et al. ................. 358/1.13 |
| 2005/0102371 A1 * | 5/2005 | Aksu ............................. 709/217 |
| 2006/0031751 A1 * | 2/2006 | Ehud ........................... 715/501.1 |
| 2007/0022102 A1 * | 1/2007 | Saxena .............................. 707/3 |
| 2007/0276989 A1 | 11/2007 | Mosek et al. |
| 2008/0201331 A1 * | 8/2008 | Eriksen et al. ................... 707/10 |
| 2009/0037593 A1 * | 2/2009 | Curtis ........................... 709/229 |

(Continued)

OTHER PUBLICATIONS

Adl-Tabatabai et al., "Prefetch Injection Based on Hardware Monitoring and Object Metadata," Jun. 2004, ACM, p. 267-276.*

(Continued)

*Primary Examiner* — Kambiz Zand
*Assistant Examiner* — Demaris Brown
(74) *Attorney, Agent, or Firm* — Steve Crocker; Jim Ross; Micky Minhas

(57) ABSTRACT

Retrieval and local storage of data at mobile devices is managed by employing a scheduling policy based on a prediction policy of a preloader, a pre-render policy, and with respect to a current viewport state to reduce waiting time and mobile device resource usage. Portions of data maintained on a server associated with a client device are retrieved and preloaded into the client device memory to enable a user to view documents seamlessly while navigating through a document without overburdening the client device memory and/or processing capacity based on a prediction. A current viewing position of the document and user navigation on the document via a touch action or gesture are detected and next portion of data to present another portion of the document is predicted. A request manager may retrieve the requested data from the server and pre-rendered so that it is available when requested by the user.

20 Claims, 8 Drawing Sheets

(56) References Cited

U.S. PATENT DOCUMENTS

| | | | |
|---|---|---|---|
| 2009/0086238 A1* | 4/2009 | Dozier | 358/1.13 |
| 2009/0112975 A1* | 4/2009 | Beckman et al. | 709/203 |
| 2009/0199190 A1 | 8/2009 | Chen et al. | |
| 2009/0260035 A1* | 10/2009 | Yang | 725/44 |
| 2010/0070862 A1* | 3/2010 | Partovi et al. | 715/716 |
| 2011/0035656 A1* | 2/2011 | King et al. | 715/234 |
| 2011/0047498 A1* | 2/2011 | Hendricks | 715/776 |
| 2011/0261377 A1* | 10/2011 | Kujirai et al. | 358/1.9 |
| 2012/0084343 A1* | 4/2012 | Mir et al. | 709/203 |
| 2013/0007103 A1* | 1/2013 | Braun et al. | 709/203 |
| 2013/0086264 A1* | 4/2013 | Kini et al. | 709/225 |

OTHER PUBLICATIONS

Marathe et al., "PFetch: Software Prefetching Exploiting Temporal Predictability of Memory Access Streams," Oct. 2008, ACM, p. 1-8.*

Vujic et al., "Automatic Prefetch and Modulo Scheduling Transformations for the Cell BE Architecture," Apr. 2010, IEEE, vol. 21 No. 4, p. 494-505.*

"Web Developer's Guide to Prerendering in Chrome", Retrieved at <<http://code.google.com/chrome/whitepapers/prerender.html>> Jul. 18, 2011, pp. 4.

Chiou, et al., "Scheduler-Based prefetching for Multilevel Memories", Retrieved at <<http://csg.csail.mit.edu/pubs/memos/Memo-444/memo-444.pdf>> Jul. 2001, pp. 27.

* cited by examiner

PREDICTING AND RETRIEVING DATA FOR PRELOADING ON CLIENT DEVICE

BACKGROUND

Modern communication systems may enable client devices such as mobile devices, smart phones, tablets, and other personal computing devices to run software and applications, open web pages, and view documents. These client devices may typically have smaller memory capacity and lower processing speed compared to larger computing devices, and, therefore, the data associated with the software, applications, and documents utilized by the client devices may be stored and/or processed on a remote server residing in a cloud rather than locally on the client devices in order to preserve the memory and/or processing capacity on the client device.

Since the data is not stored locally on the client device, when the client device needs data associated with the software, applications, and documents utilized by the client device, the client device may retrieve the data from the server residing on the cloud and may load the data onto the client device memory. As a result, the user may experience a lag or wait time while the data is retrieved from the server and loaded onto the client device. The lag or wait time can additionally be impacted by network bandwidth available for transmitting requested data, and a limited network bandwidth can increase the wait time a user experiences for requested data to load onto the client device.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a managing retrieval and local storage of data at mobile devices employing a scheduling policy based on a prediction policy of a preloader, a pre-render policy, and with respect to a current viewport state to reduce waiting time and mobile device resource usage. Portions of data maintained on a remote server residing on a cloud associated with a client device may be retrieved and preloaded into the client device memory to enable a user to view documents seamlessly as they navigate through a document without overburdening the client device memory and/or processing capacity based on a prediction. A current viewing position of the document and user navigation on the document via a touch action or gesture may be detected and next portion of data to present another portion of the document may be predicted. A request manager may retrieve the requested data from the server and pre-rendered so that it is available when requested by the user.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
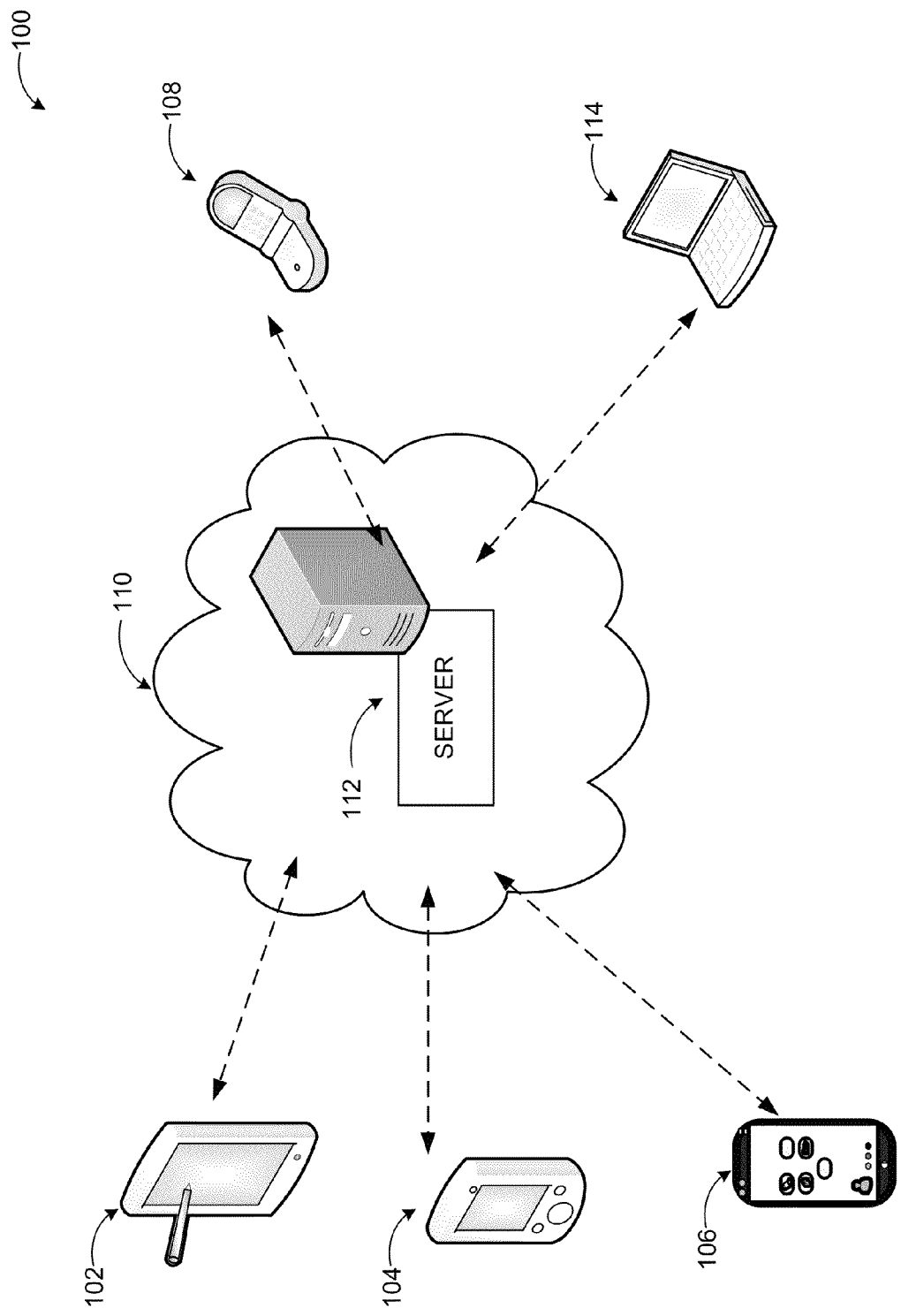
FIG. 1 illustrates an example networked environment for enabling client devices to retrieve data over a cloud based network, according to embodiments.

As briefly described above, scheduling policy of a mobile device for retrieving data from a server to display a document may be modified to employ a prediction policy of a preloader, a pre-render policy, and a current viewport state so that user waiting time while navigating through the document and device resources such as memory and processing capacity may be optimized.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Throughout this specification, the term "platform" may be a combination of software and hardware components for preloading predicted data onto a client device in a networked environment. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

According to some embodiments, a gesture-enabled input device and display screen may be utilized for viewing documents and receiving input from a user over a user interface. The gesture-enabled input device and display screen may utilize any technology that allows touch input or optically captured gestures by a user to be recognized. For example, some technologies may include, but are not limited to: heat, finger pressure, high capture rate cameras, infrared light, optic capture, tuned electromagnetic induction, ultrasonic receivers, transducer microphones, laser rangefinders, shadow capture, and the like. The user interface of a touch-enabled or gesture-enabled device may display content and documents associated with word processing applications, presentation applications, spreadsheet applications and web page content, and menus of actions for interacting with the displayed content. A user may use gestures to interact with the user interface to access, view and edit the content, such as documents, tables, spreadsheets, charts, lists, and any content (e.g., audio, video, etc.). The gesture-enabled input device may make use of features specific to touch or gesture enabled computing devices, but may also work with a traditional mouse and keyboard. A touch input action, such as a tap or swipe action as used herein may be provided by a user through a finger, a pen, a mouse, or similar device, as well as through predefined keyboard entry combinations, eye-tracking, and/or a voice command.

FIG. 1 illustrates an example networked environment where embodiments may be implemented. In an example networked environment, one or more devices, such as mobile device 108, smart phones 104, 106, tablet 102, and other personal computing device 114 may operate in conjunction with a remote server over a cloud 110. Client devices such as smart phones 106 and mobile device 108 may have small memory capacity and low processing or CPU speed compared to larger computing devices, and therefore software, applications, and application data, which may be utilized by the client devices, may be stored and processed on the remote server 112 residing in the cloud 110 rather than locally on the client devices in order to preserve resources of the client device.

In an example embodiment, the remote server 112 residing in the cloud 110 may store, maintain, and manage application data for applications executed on the client device, and through a browser or similar application executed on the client device, the client device may connect to the cloud for retrieving requested application data and loading the data onto the client device. The client device may connect to the server 112 on the cloud 110 via a networked environment, which may be a wireless or wired network as some examples, and likewise the application data may be delivered from the server 112 residing on the cloud 110 to the client device via the networked environment. When a user activates an application on the users' client device and/or opens a document, for example, since the data is not stored locally on the client device, the client device may retrieve the data over the network from the server 112 residing in the cloud 110. As a result, the user may experience a lag or wait time while the data is retrieved from the server 112 and loaded onto the client device. The lag or wait time can additionally be impacted by network bandwidth available for transmitting requested data, and a limited network bandwidth can increase the wait time a user experiences for requested data to load onto the client device.

Some example systems addressing the wait time a user experiences for retrieving and loading requested data onto a client device may include loading the entire document onto the client device when the document or application is initially opened, and preloading requested data by a first come first serve (FCFS) method and/or a last come first serve (LCFS) method and saving the preloaded data on a local cache associated with the client device. While these systems address some of the issues encountered with wait time associated with retrieving and loading data to a client device, these systems typically load all of the data for the entire document which may take up valuable memory space and CPU utilization on the client device. Further, an initial long wait time may be experienced as the user must wait for the entire document data to be retrieved and downloaded.

Figure 2:
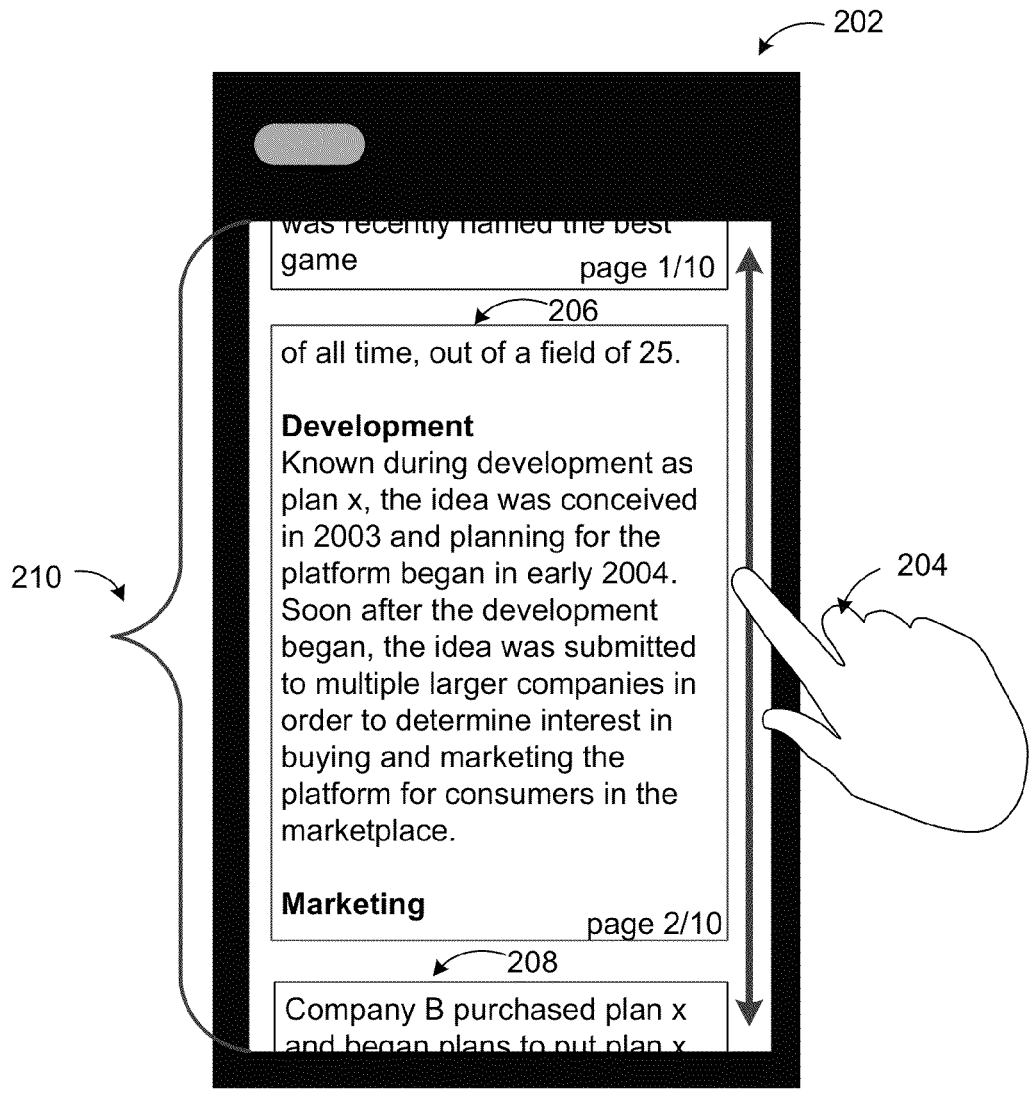
FIG. 2 illustrates an example viewport of a gesture-enabled device, according to embodiments.

FIG. 2 illustrates an example viewport 210 of a gesture-enabled device, according to embodiments. In an example embodiment, a client device 202 as described in conjunction with FIG. 1 may be a gesture-enabled device such as a touch-enabled smart phone. A user may execute an application on the touch-enabled smart phone for viewing a document or a web page, for example, and the user may utilize touch actions 204, such as tapping and swiping, to navigate through the document to a new page 208. When an application is activated on the client device 202 and a document or web page is viewed on the viewport 210 of the client device 202, such as the smart phone, the data associated with the application and the document may be accessed and retrieved by the client device 202 from where it is served on the server residing in the cloud.

In an example scenario, a user may view a document 206 having ten pages on a gesture-enabled device such as a smart phone, and the viewport 210 of the smart phone may display one page at a time. The user may currently view page one, and in order to navigate to page two through page ten, the user may employ a dragging or swiping action. Since the data is not stored locally on the client device 202, the retrieved data may not be provided immediately, and the user may experience a lag or wait time as the data is retrieved from the server and loaded onto the client device 202. For example, as the user drags to navigate from page one to page two, the user may experience a delay as a request is sent to the server to retrieve the data for page two and the data is downloaded onto the client device 202.

Similarly, if the user skips from page one to page ten using a dragging action, an even longer delay may be experienced as the user may consecutively drag from page two to three to four and so on until reaching page ten. Navigating through the document 206 using a dragging action may require consecutive data between pages one and ten to be retrieved and downloaded in order to navigate to page ten, such that even though the user has not requested to view pages two through nine, the user may have to wait for pages two through nine to be retrieved and downloaded to the client device 202 in order to view page ten.

As previously described, some systems for reducing the wait time may by local cache or preloading requested data. The local cache can save the data if it is retrieved and downloaded, then the client can use the data directly if user navigates to the page which was visited.

For the preloading requested data, client retrieves and downloads the unvisited data initiatively by page one to the last page or revert order in the background and save to the local cache within device 202, and the data may be kept in the local cache until the application or document 206 is closed, thus taking up valuable memory on the client device 202 which may have a fairly small memory capacity.

In order to get the data from the server, system may retrieve the data by first come first serve (FCFS) method and/or a last come first serve (LCFS) method and saving the preloaded data on a local cache associated with the client device 202.

In an example scenario, the user may currently view page ten on the viewport 210 of the smart phone, and the user may drag on the touch screen viewport 210 from page ten to a target page far away from current page ten. Using the FCFS method, the target page may be retrieved and delivered after all of the pages between the starting page ten and the target page are retrieved and delivered, thus the wait time the user experiences is the time required for all of the pages in between the starting and target page to be retrieved and downloaded. In an LCFS method, in the scenario described above, when the user drags on the touch screen viewport 210 from page ten to a target page far away from current page ten, then the target page may be retrieved and downloaded first, and the pages in between the starting and target page to be retrieved and downloaded in reverse order. In both scenarios, the retrieved and downloaded data may be saved on a local cache within the client device 202, and the data may be kept in the local cache until the application or document 206 is closed, thus taking up valuable memory on the client device 202 which may have a fairly small memory capacity.

A system according to embodiments may enable the wait time a user experiences for retrieving requested data and loading the data onto the user's client device 202 for viewing on the viewport 210 to be minimized. The system may enable data prediction and data loading components to predict an upcoming data request on the client device 202 and to pre-render and preload the predicted data onto the client device 202. The predicted data may temporarily be stored in a local cache and pre-rendered on the client device 202 for enabling fast retrieval upon receiving a data request, and thus reducing the lag or wait time experienced by the user due to retrieval and loading the data on the client device 202.

Figure 3:
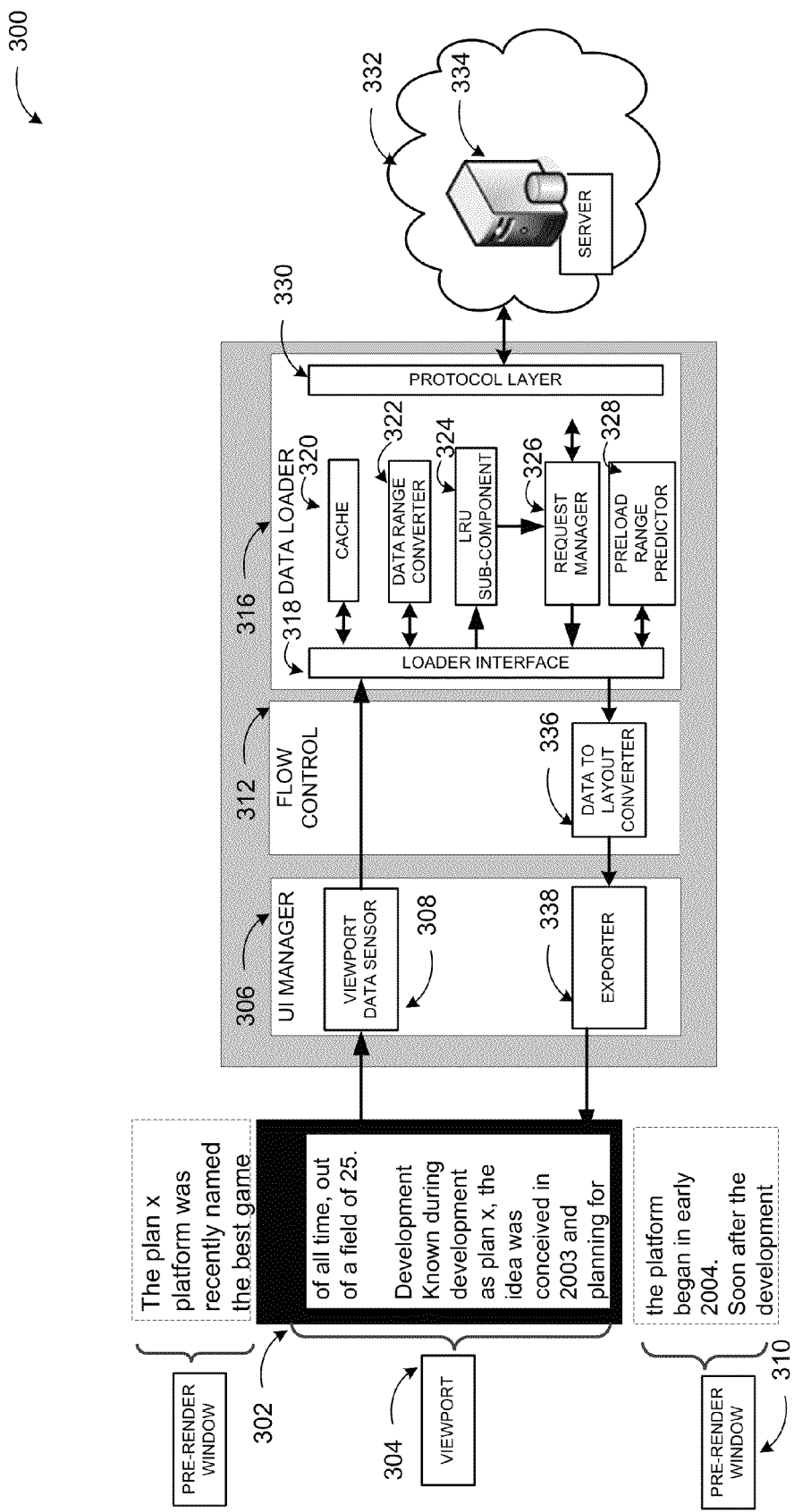
FIG. 3 illustrates example components for retrieving and preloading data requests, according to embodiments.

FIG. 3 illustrates example components for retrieving and preloading data requests, according to embodiments. As demonstrated in diagram 300, a client device may be a gesture-enabled device and may include a viewport 304 for displaying applications and documents that are opened and viewed on the client device. A user interface manager component 306 may enable a user to interact with the user interface or viewport of the gesture-enabled client device 302 via touch actions on the viewport 304. The client device 302 may include a viewport sensor 308 associated with the viewport 304 for determining a current position of a document viewed on the viewport 304 and for detecting a touch action by the user to navigate the open document.

As previously described, the user may use a drag action to navigate through pages of a document viewed on the viewport 304 of the client device 302. The viewport sensor 308 may be configured to detect user input on the user interface as an initial touch (e.g., touchstart, mousedown, MSPointerdown depending on the browser), a drag or swipe action (e.g., touchmove, mousemove, MSPointerMove depending on the browser), and ending touch or touch release (e.g., touchend, mouseup, MSPointerUp depending on the browser) actions, for example, for determining the current page position, scrolling to a new page, and an end or target page position of the document. If the ending touch action ends on a new page, then the viewport sensor 308 may determine that the data for the new page is needed, and may send a data request to a data loader component 316 for retrieving the data.

The viewport sensor 304 may also be associated with a pre-render window 310, which may receive downloaded data for making the data available to the user with a minimal wait time. In an example embodiment, when requested data is retrieved, the user interface manager 306 may provide retrieved data to the viewport sensor 308 and the pre-render window 310. The data provided to the pre-render window 310 may be data that is predicted the user may request next, and may be temporarily rendered and stored in the pre-render window 310 so that it is readily available if the user requests it. If the user navigates to a new page and the data for the new page has been downloaded and stored in the pre-render window 310, then upon receiving the request, the viewport sensor 308 may retrieve the requested data from the pre-render window 310 and immediately display the requested page data in the viewport 304, vastly reducing the wait time experienced by the user.

In a system according to embodiments, the pre-render window 310 may be configured to render and store a small portion of the downloaded data for preserving the memory of the client device 302. For example, the pre-render window 310 may render the subsequent five pages after the current page viewed in the viewport, such that if page one is currently viewed in the viewport, the pre-render window 310 may render and store pages two through six so that they are ready to go if the user navigates to one of those pages. Further, when the user drags to page two, for example, this may trigger the pre-render window 310 to retrieve and pre-render page seven.

In an example embodiment, when a data request is received from the viewport sensor 308 of the client device 302, a flow control component 312 may serve as an intermediary component between the user interface manger component 304 and the data loader component 316. The flow control component 312 may also facilitate sending and receiving retrieved data from the data loader component 316 to the viewport 304 of client device 302. The flow control component 312 may include a data-to-layout converter 336 sub-component for reformatting data that is retrieved from the server 334 so that it matches the format of the document as it is viewed on the client device 302. For example, the retrieved data may be received in an extensible markup language (XML) format, and the data-to-layout converter 336 may perform some processing on the data, such as re-formatting color, text, font, and style attributes, and inserting links, graphics, pictures and other elements in their correct positions so that the data is viewed as it is intended on the client device 302.

In an example embodiment, a new data request from the viewport sensor 308 of the client device 302 may be transmitted through the flow control component 312 and received at a loader interface 318 associated with the data loader component 316 for coordinating the request and managing the workflow of sub-components integrated with the data loader component 316. When a new data request is initially received at the data loader component 316, the system may check to see if the requested data is currently available from a cache 320 stored locally on the client device. The cache 320 may be configured to temporarily store data that is retrieved from the remote server 334 residing in the cloud 332. For example, the cache 320 may be configured to temporarily store a maximum of twenty pages that are near the current page, and pages that are twenty-one or more pages away from the current page may be removed from the cache 320. Additionally, in order to prevent the cache 320 from occupying a large quantity of memory on the client device, the cache 320 may be deleted regularly at predefined time intervals.

In a system according to embodiments, when an initial data request is received at the data loader component 316, the system may check to see if the requested data is currently available from the cache 320, and if the requested data is identified in the cache 320, then the requested data may be directly returned to the client device 302 for display in the viewport 304. If the requested data is not identified in the cache 320, then the data loader component 316 may push the new data request to a last-recently-used (LRU) sub-component 324 integrated with the data loader component for scheduling a data request task to retrieve the data from the remote server 334.

The LRU sub-component 324 may be a data request priority scheduler configured to create data request tasks and send the data request tasks to a request manager 326 sub-component for coordinating and managing scheduled data request tasks and retrieving requested data from the server. The LRU sub-component 324 may be configured to prioritize the task list such that the last recently used task is placed as highest priority, similar to a last come first serve method, such that data requests may be filled in a reverse order. Additionally, the LRU sub-component 324 may ensure that only one of each data request is sent to the request manager 326. For example, if a new data request is created and an identical data request already exists in the request manager 326 sub-component, then the LRU sub-component 324 may move the current data request to the beginning of the prioritized data request task list.

As previously described, the request manager 326 may be configured to receive data request tasks from the LRU sub-component 324. When the data request task is received, the request manager 326 may be configured to send the data request to the server 334 residing in the cloud 332 to retrieve the requested data. The request manager 326 may retrieve the data from the server according to the prioritized order of the data request task list from the LRU sub-component 324. The request manager 326 may be configured to handle a predefined maximum number of data requests at a time, in order to preserve computing power of the client device. For example, the request manager 326 may handle a maximum of five concurrent data requests. The request manager 326 may also be configured to retry data requests in the event of a failed retrieval of data from the server 334, such as when there may be a network issue, server time-out, and other errors causing the data retrieval to fail. The request manager 326 may be configured to re-send the data request to the server a predefined maximum number of times, such as three times for example, before returning an unrecoverable error and notifying the client device of failed data retrieval. A protocol layer 330 may be configured to facilitate interaction between the request manager 326 and the server 334, and may indicate to the request manager 326 when there are network and/or server failures and errors.

In an example embodiment, if the data is successfully retrieved from the server 334, then the request manager 326 may return the data to the loader interface 318 for coordinating managing the workflow of the sub-components integrated with the data loader component 316. The loader interface may facilitate delivering the retrieved data to the data range converter sub-component 322 for normalizing the data, and the data may be sent to the cache 320 for temporary storage. When the data is first retrieved from the server, the data may be normalized by a data range converter sub-component 322. Normalization by the data range converter sub-component 322 may include translating page numbers, names, units, and other formatting so that the data from the server matches the format of the data as it is viewed on the client device. For example, a document on the server may include ten pages as a pageset, and the client device 302 may view one page at a time, so the data range converter sub-component 322 may convert the pageset to ten individual pages so that each page is separately identified and viewable on the client device 302. The data range converter sub-component 322 may also normalize a received data request into a format recognized by the server for requesting and retrieving the data from the server.

Additionally, after normalization, the data may be exported for viewing on the client device 302. The exported data may be managed by the data-to-layout converter 336 associated with the flow control component 312 before export to the client device via the user interface manager 306 for reformatting the retrieved data to match the format and layout of the document as it is viewed on the client device 302, such as adding page numbers and page breaks. Once the data has been successfully reformatted, the data-to-layout converter 336 may pass the data to an exporter 338 sub-component integrated with the user interface manager 306 for export to the client device 302. The exporter 338 may add additional document information such as headers, footers, page breaks, page numbers and other page identifying characteristics for formatting the data so that the document is clearly and accurately viewed as intended on the viewport 304 of the client device.

In an additional embodiment, the system may include a preload range predictor 328 configured to predict where the user may navigate to next and which data may need to be retrieved and loaded based on the current position of the document on the viewport 304 of the client device 302 and the last two received data requests. When the last data request from the client device, or the target page data, is identified in the cache 320 or is returned from server 334, then the preload range predictor 328 may be configured to predict the range of page data for preloading, so that it can be pre-rendered within the pre-render window 310 on the client device 302. Based on the last two received data requests, the preload range predictor 328 may predict which data may be requested next by the client device 302. For example, if the last two data requests are to load pages four and five, then the preload range predictor 328 may predict that the user will drag to page six next. The preload range predictor 328 may enable the predicted data for page six to be retrieved from the cache and/or the server for export to the client device 302.

The predicted data may include a predefined number of previous and subsequent pages to the current page viewed on the viewport. For example, if the user is currently viewing page ten of a document on the viewport, then the preload range predictor 328 may predict that the user is likely to navigate to page eleven next. The requested predicted data may include the previous five pages, pages five through nine, and the next five pages, pages eleven through fifteen. In an example embodiment, if the predicted data is not identified in the cache 320, then the LRU sub-component 324 may create a new task for the request manager 326 sub-component to retrieve the predicted data from the server based on the pages predicted by the preload range predictor 328. Additionally, the data associated with the page count may depend on the application and/or document. For example, five pages may be preloaded if the document is a word processing document, while two pages may be preloaded if the document is a presentation document such as a slideshow for example.

Further, because the LRU sub-component 324 may be configured to fill data requests in a reverse order, then the data requests for the predicted data range may be sent to the LRU sub-component 324 in reverse order so that the page closest to the current page may be requested first. For example, if the predicted data range is pages eleven through fifteen, then the data requests for the pages may be sent to the LRU sub-component 324 in the order: page fifteen, page fourteen, page thirteen, page twelve, and page eleven, so that the LRU sub-component 324 may schedule the request manager 326 to send the data requests to the server 334 in the order: page eleven, page twelve, page thirteen, page fourteen, and page fifteen, and page eleven, the page closest to page ten, may be filled first. The retrieved predicted data may be exported via the exporter 338 of the user interface manager 306 and pre-rendered in the pre-render windows 310 so that it may be readily available if and when requested by the user.

Figure 4:
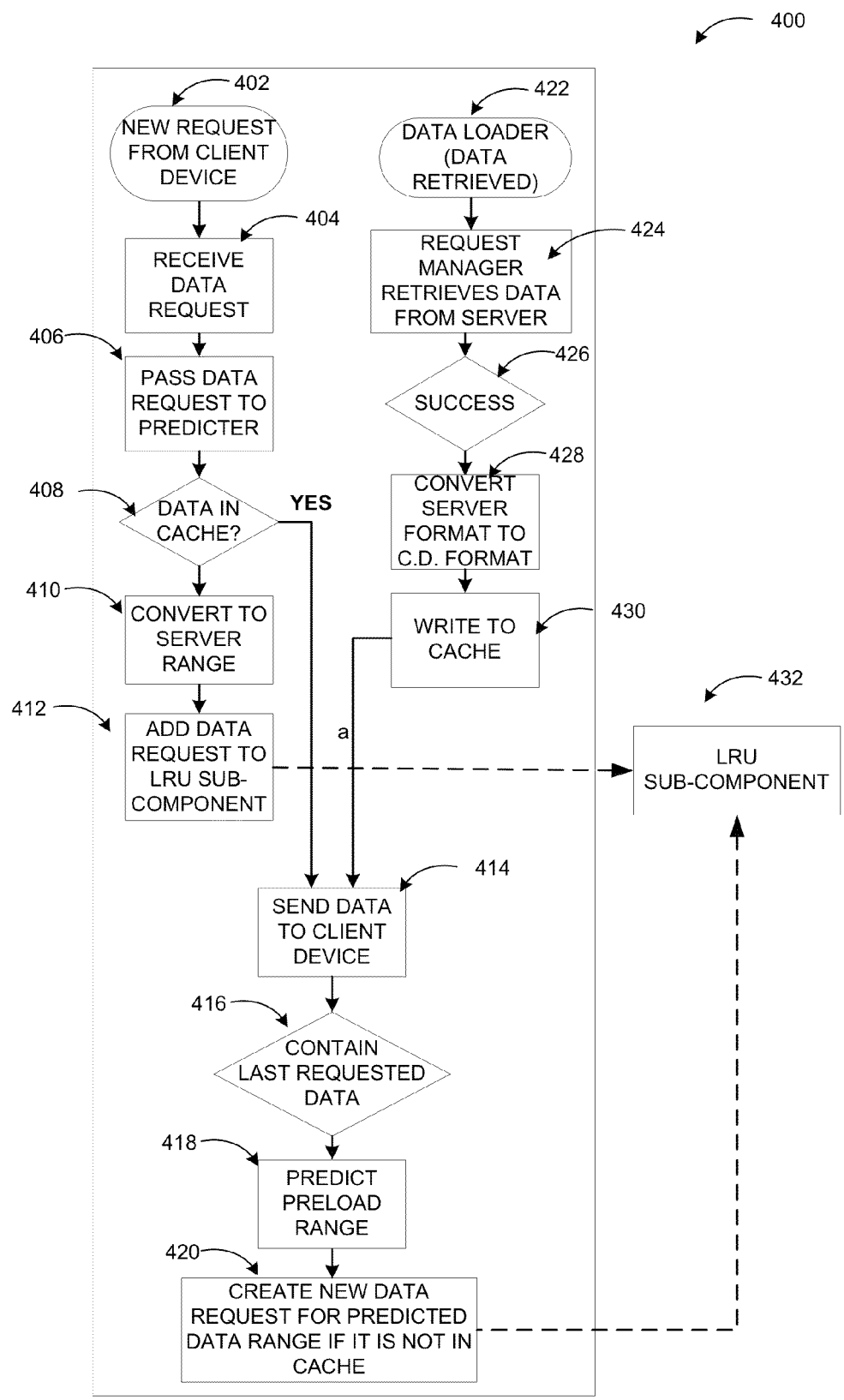
FIG. 4 illustrates an example workflow scenario for retrieving and preloading data onto a mobile device, according to embodiments.

FIG. 4 illustrates an example workflow scenario for retrieving and preloading data onto a mobile device, according to embodiments. As discussed above in conjunction with FIG. 3, a user may navigate through a document on the viewport of a client device, and a viewport sensor may detect navigation to a new page. The viewport sensor may detect the navigation to the new page and may send a new data request 402 to the data loader component for retrieving the data associated with the new page. The data loader may receive the new data request 404 and begin a process for retrieving the data and returning it to the client device. The data loader may pass 406 the new data request to the preload range predictor sub-component for predicting subsequent page requests for preloading and pre-rendering in the pre-render window on the client device.

In an example embodiment, the data loader may first identify if the requested data is already located in the cache 408, and if the requested data is identified in the cache, then the requested data may be returned to the client device 414 for display in the viewport. If the requested data is not identified in the cache, then the data loader may convert and reformat the data request into a format utilized by the server 410 and may add 412 a new data request to the LRU sub-component 432 for scheduling a data request task to retrieve the data from the remote server 334. When the data is received at the client device, the system may determine if the returned data contained the last requested data 416, and if so, the preload range predictor sub-component may predict 418 a range of subsequent data requests based on the currently viewed data and the last two data requests. The preload range predictor sub-component may create a new data request 420 for the predicted data range and send to the data request to the LRU sub-component for creating task for the request manager to retrieve the predicted data range if the predicted data is not in the local cache 320.

In an additional embodiment, if the data was not located in the cache and is retrieved from the server, the data loader 422 may receive the retrieved data from the request manager 424. If the data is successfully retrieved 426, then the data may be reformatted 428 at a data-to-layout converter sub-component so that it matches the format of the document as it is viewed on the client device (from server format to client device "C.D." format). The data may be temporarily written to the cache 430 and may also be exported to the client device 414.

Figure 5:
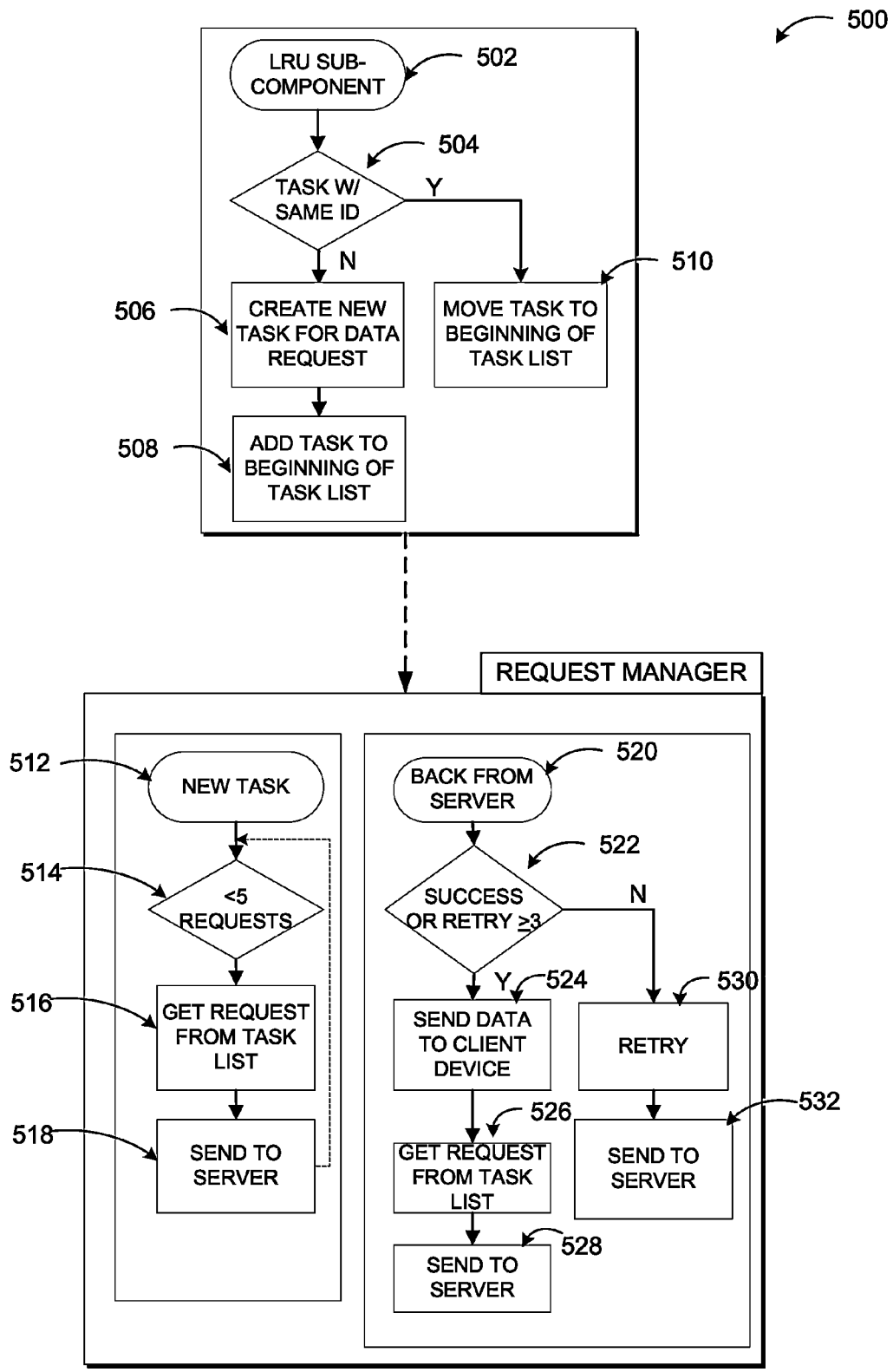
FIG. 5 illustrates an example workflow scenario for creating tasks to retrieve data and retrieving data from a remote server, according to embodiments.

FIG. 5 illustrates an example workflow scenario for creating tasks to retrieve data and retrieving data from a remote server, according to embodiments. As described above in conjunction with FIG. 4, if a data request is received at the data loader and the data is not identified in the cache, then the data loader may push the data request to the LRU sub-component 502 integrated with the data loader component for scheduling a data request task to retrieve the data from the remote server. The LRU sub-component 502 may be a data request priority scheduler configured to create data request tasks and send the data request tasks to a request manager sub-component for coordinating and managing scheduled data request tasks and retrieving data from the server. The request manager sub-component may ensure that only one of each data request is sent to the request manager sub-component and if the data request task already exists, then the LRU sub-component may move the current data request to the beginning of the prioritized data request list 510. If a data request task for the new data request does not already exist, the LRU may create a new task for the data request 506 and may add the newly created task to the beginning of the task list 508 for the request manager.

In an example embodiment the request manager may manage the data request task list for retrieving requested data and may receive the new data request task 512 from the LRU sub-component. When the new data request task is submitted, the request manager may be configured to send the data request to the server 334 residing in the cloud 336 to retrieve the requested data. The request manager may confirm that the maximum number of concurrent data request tasks are not currently being performed 514, and if less than the maximum number of requests are currently being performed, the request manager may receive the new data request task from the task list 516 and may send the new data request to the remote server 518.

In a further embodiment, the request manager may be configured to receive the retrieved data back from the server 520. When the data is received the request manager, via a protocol layer, the data loader component may determine if the data was successfully retrieved 522. If the requested data is not successfully retrieved, then the request manager may also be configured to manage retry 530 requests and may re-send 532 the data request to the server. The request manager may also be configured to retry 530 the data request a predefined maximum number of times, such as three times for example, before returning an unrecoverable error and notifying the client device of failed data retrieval. If the requested data is successfully retrieved, then the request manager may enable the data loader to send the retrieved data to the client device 524. The request manager may then retrieve a new data request from the task list 526 and may send the new data request to the server 528 to continuously retrieve new and predicted data requests.

The example systems in FIG. 1 through 5 have been described with specific configurations, applications, and interactions. Embodiments are not limited to systems according to these examples. A system for retrieving and preloading predicted data onto the client device may be implemented in configurations employing fewer or additional components and performing other tasks. Furthermore, specific protocols and/or interfaces may be implemented in a similar manner using the principles described herein.

Figure 6:
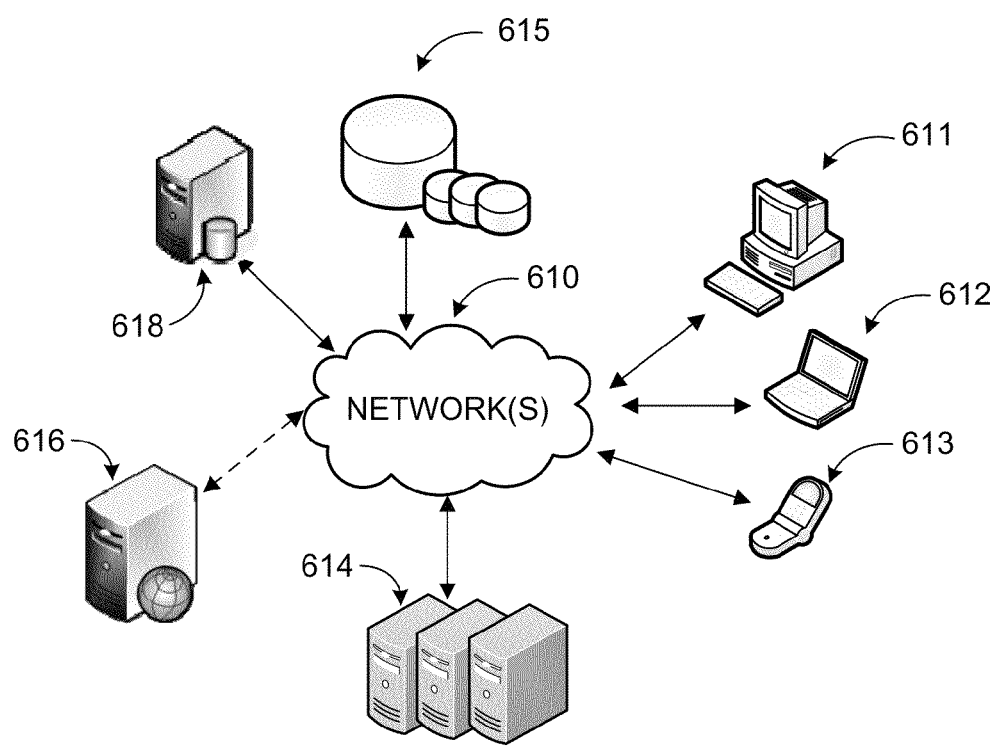
FIG. 6 is a networked environment, where a system according to embodiments may be implemented.

FIG. 6 is an example networked environment, where embodiments may be implemented. A system for retrieving and preloading predicted data onto a client device may be implemented via software executed over one or more servers 614 such as a hosted service. The platform may communicate with client applications on individual computing devices such as a smart phone 613, a laptop computer 612, or desktop computer 611 ('client devices') through network(s) 610.

Client applications executed on any of the client devices 611-613 may facilitate communications via application(s) executed by servers 614, or on individual server 614. An application executed on one of the servers may facilitate receiving and predicting data requests from a client device, retrieving requested data, and preloading predicted data onto the client device. The application may retrieve relevant data from data store(s) 615 directly or through database server 618, and provide requested services (e.g. document editing) to the user(s) through client devices 611-613.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to retrieve and preload predicted data onto a client device. Furthermore, the networked environments discussed in FIG. 6 are for illustration purposes only. Embodiments are not limited to the example applications, modules, or processes.

Figure 7:
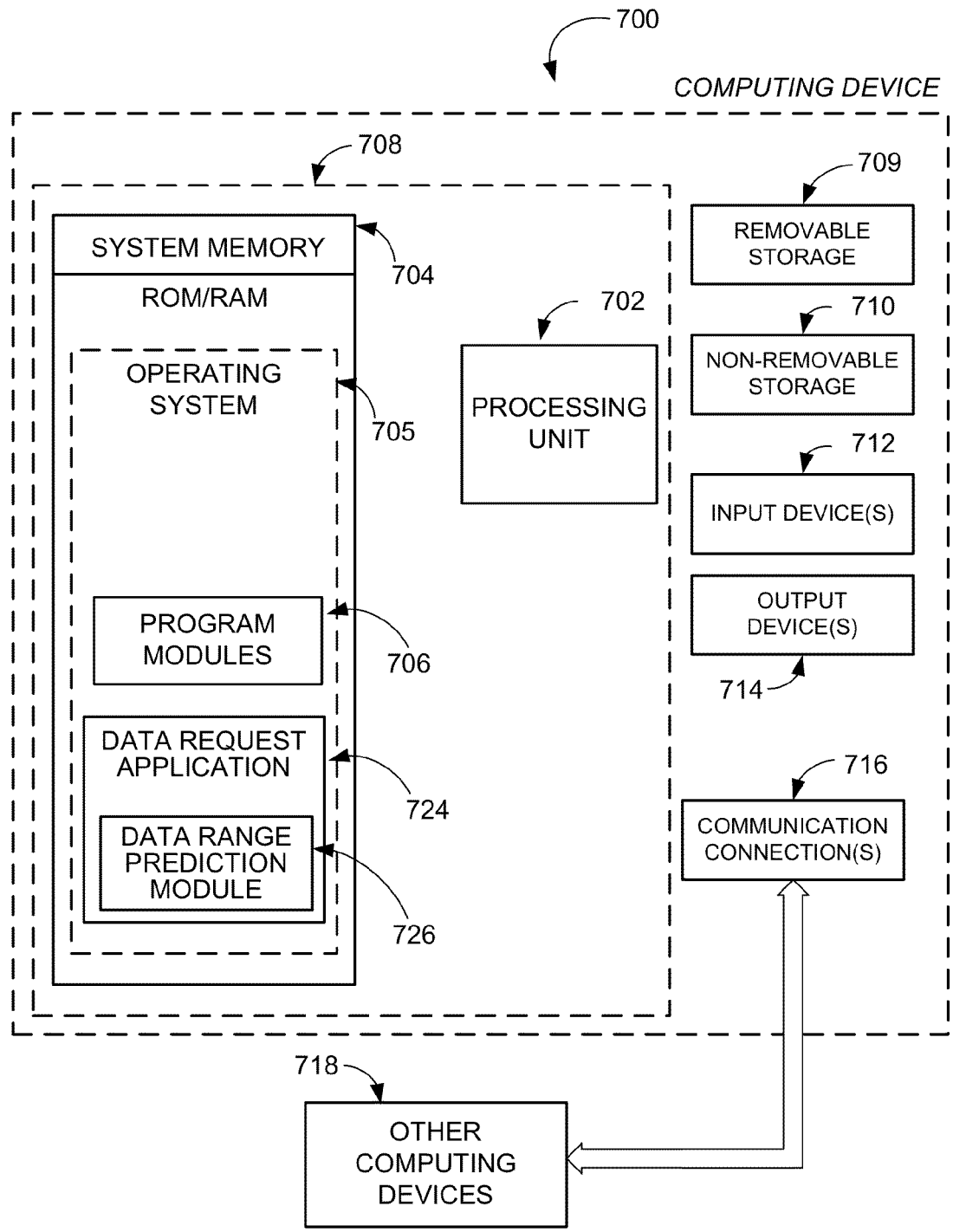
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a client device retrieving and preloading predicted data according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as a data request application 724 and data range prediction module 726.

The data request application 724 may facilitate receiving and predicting data requests from a client device, retrieving requested data, and preloading predicted data onto the client device. The data request application 724 may enable a computing device 700 to detect a document that is viewed in the viewport of a client device such as a smart phone, determine the current position of the document as it is currently viewed by a user, and detect navigation to new pages of the document on the viewport. The data request application 724 may facilitate retrieving the data for the new pages from a remote server associated with the client device. Through the data range prediction module 726, data request application 724 may predict a data range of pages a user is likely to navigate to next on the client device based on the current position of the document on the client device and recent data requests. The data range prediction module 726 may enable the predicted data range to be retrieved from the server and downloaded to the client device where it may be pre-rendered so that it is readily available when requested by the user. Data request application 724 and data range prediction module 726 may be separate applications or integrated modules of a hosted service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, an eye-tracking device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
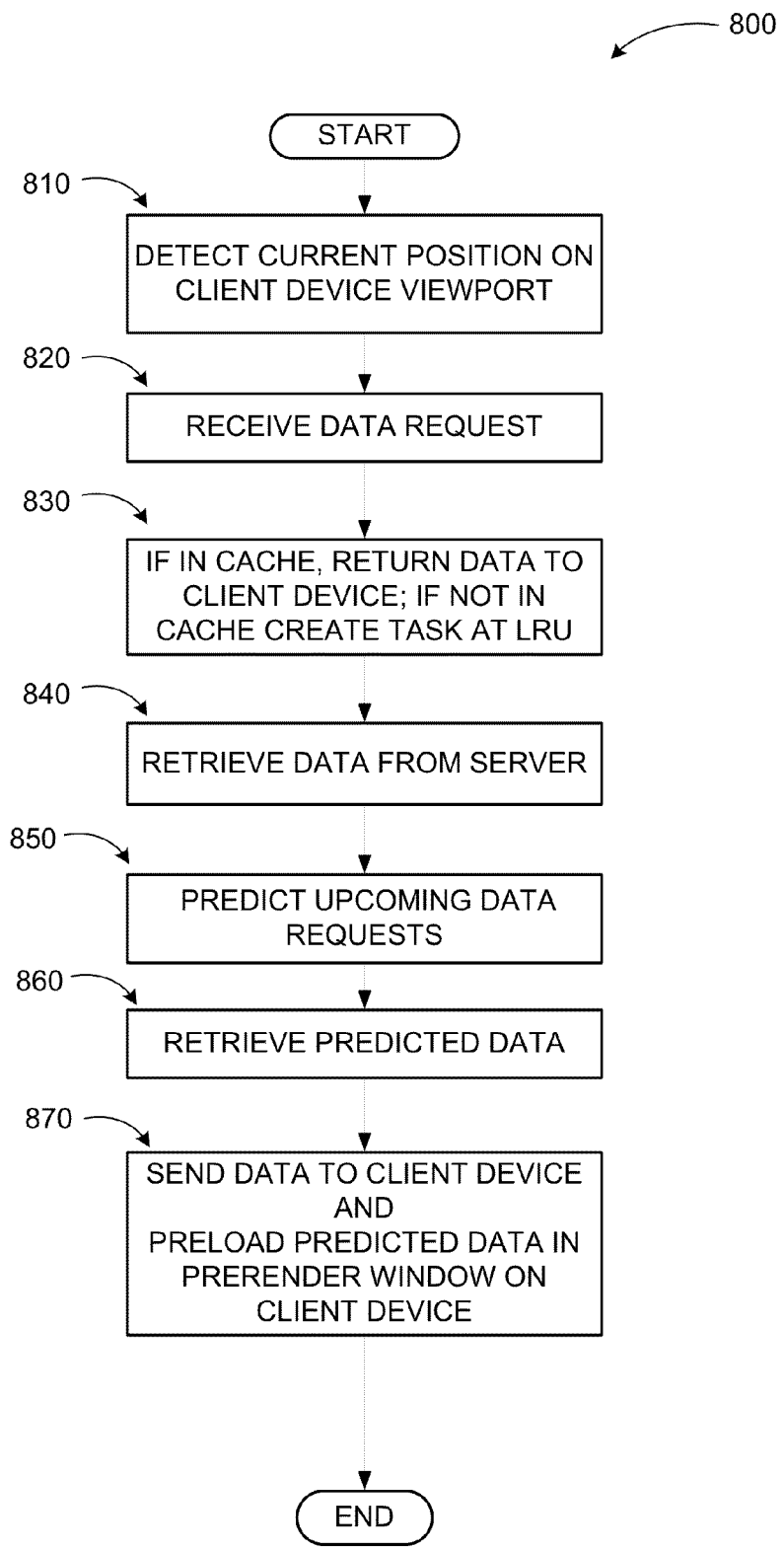
FIG. 8 illustrates a logic flow diagram for a process of detecting and predicting data requests for pre-rendering on a client device, according to embodiments.

FIG. 8 illustrates a logic flow diagram for process 800 of detecting and predicting data requests for pre-rendering on a client device, according to embodiments. Process 800 may be implemented on a computing device or similar electronic device capable of executing instructions through a processor.

Process 800 begins with operation 810, where the system may determine a current position of a document viewed on the viewport of the client device and may detect a touch action, such as a swipe or drag, by the user to navigate the open document. If the ending touch action ends on a new page, then a viewport sensor associated with client device may determine that data for the new page is needed, and may send a data request to a data loader component associated with the client device for retrieving the data. The data loader component may receive the data request at operation 820, and at operation 830 when the data request is received at the data loader component, the system may check to determine if the requested data is currently available from a local cache associated with the data loader component. If the requested data is identified in the cache, then the requested data may be directly returned to the client device for display in the viewport. If the requested data is not identified in the cache, then the data loader component may push the new data request to a last-recently-used LRU sub-component integrated with the data loader component for scheduling a data request task to retrieve the data from the remote server.

A request manager may be configured to receive data request tasks from the LRU sub-component, and when the data request task is received, at operation 840, the request manager may be configured to send the data request to a remote server to retrieve the requested data. At operation 850, a preload range predictor may be configured to predict where in the document the user may navigate to next based on the current position of the document on the viewport of the client device and the last two received data requests at the data loader component. The preload range predictor may be configured to predict a range of page data, such as the next five pages and the previous five pages, and at operation 860 the request manager may retrieve the predicted data range from the remote server and/or the local cache. At operation 870, the data retrieved from the server, including a new data request and retrieved predicted data range may be exported to the client device and pre-rendered in the pre-render windows so that the data for upcoming pages of the document may be readily available if and when requested by the user.

The operations included in process 800 are for illustration purposes. Retrieving and preloading predicted data onto a client device may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for retrieving and preloading predicted data onto a client device, the method comprising:
   determining a current page position of a document viewed on a user interface of a client device;
   detecting navigation to a new page of the document on the user interface;
   predicting an upcoming data range request based on the determined current page position and the navigation;
   submitting the data range request to a remote server;
   preloading requested data on the remote server by a first come first serve (FCFS) scheme;
   retrieving the requested data from the remote server by the FCFS scheme;
   storing the requested data on a local cache associated with the client device until one of the document or an application associated with the document is closed;
   deleting the local cache at predefined time intervals to prevent the local cache from occupying memory on the client device; and
   normalizing the requested data by translating at least one of: at least one page number, at least one name, at least one unit, and at least one formatting to match a format of the document viewed on the user interface of the client device.

2. The method of claim 1, further comprising:
   pre-rendering the retrieved data for the predicted data range in a pre-render window associated with the user interface of the client device.

3. The method of claim 2, wherein the pre-rendered data includes a predefined number of pages before to the current page position and another predefined number of pages after the current page position.

4. The method of claim 1, further comprising:
   identifying whether the predicted data range is stored in the local cache associated with the client device; and
   if the requested data is identified in the local cache, retrieving the requested data from the local cache; else sending the data request to a last-recently-used (LRU) component for scheduling a data request task to retrieve the requested data from the remote server.

5. The method of claim 4, further comprising:
   sending the data request task to the remote server if there are less than a predefined number of tasks being served at the same time.

6. The method of claim 4, wherein scheduling a data request task to retrieve the requested data from the remote server further comprises:
   creating a data request task list; and
   sending the data request task list to a request manager component for retrieving the requested data from the remote server.

7. The method of claim 6, wherein creating a data request task list further comprises:
   scheduling the last recently received data request as highest priority; and
   prioritizing the data request tasks on the data request task list in reverse order from the last recently received data request.

8. The method of claim 7, further comprising:
   if a data request task for the last recently received data request already exists on the data request task list, then moving the existing data request to the highest priority on the data request task list.

9. The method of claim 7, further comprising:
configuring the request manager to retrieve the requested data from the remote server according to the order of the prioritized data request task list.

10. The method of claim 1, wherein the client device is a gesture-enabled device including one of: a smart phone, a tablet, a mobile device, and a personal computing device.

11. The method of claim 10, wherein the navigation to the new page of the document includes one or more of: a tap, a swipe, and a drag action to the new page on the user interface of the gesture-enabled device.

12. A client device retrieving and preloading predicted data onto a local memory on the client device, the client device comprising:
a memory storing instructions;
a processor coupled to the memory, the processor executing a data request application in conjunction with the instructions, wherein the data request application is configured to:
determine a current page position of a document viewed on a user interface of a client device;
detect navigation to a new page of the document on the user interface;
predict an upcoming data range request at a preload predictor sub-component associated with the client device based on the determined current page position and the navigation;
normalize the data range request to a format recognizable by a remote server;
submit the data range request to the remote server;
retrieve the requested data from the remote server;
retry to retrieve the data range request in response to a failure to retrieve the requested data from the remote server, wherein the failure includes one or more of a network issue and a server time-out; and
pre-render the retrieved data for the predicted data range in a pre-render window associated with the user interface of the client device.

13. The client device of claim 12, wherein the data request application is further configured to:
predict a direction of the navigation based on last two data requests; and
create a new task to retrieve the data based on a prediction result.

14. The client device of claim 12, wherein the data is retrieved in pages and a number of pages to be requested is determined based on a type of the data request application.

15. The client device of claim 12, wherein the current page position of the document is determined and the retrieved data pre-rendered by a viewport data sensor component of a user interface manager.

16. The client device of claim 12, wherein a request manager sub-component located in a data loader component in the client device is configured to:
retrieve a predefined maximum number of data requests from the remote server concurrently.

17. The client device of claim 16, wherein the request manager sub-component located in the data loader component in the client device is further configured to:
send one or more data requests for the predicted data range to a last recently used (LRU) sub-component located in the data loader component in the client device in a reverse order beginning with a data request for the page furthest away from the current page position.

18. The client device of claim 12, wherein the data request application is further configured to:
upon detection of navigation to a new page of the document on the user interface, determine if data for the new page has been pre-rendered in the pre-render window associated with the user interface of the client device; and
load the pre-rendered data from the pre-render window onto the user interface of the client device.

19. A method executed in a computing device for retrieving and preloading predicted data onto a client device, the method comprising:
determining a current page position of a document viewed on a user interface of a client device;
detecting navigation to a new page of the document on the user interface;
predicting an upcoming data range request based on the determined current page position and the navigation at a preload predictor sub-component;
configuring a last recently used (LRU) sub-component to create a data request task list of data request tasks for retrieving the requested data for the new page and the predicted data range;
normalizing the data range request to a format recognizable by a remote server;
submitting the data range request to the remote server from a request manager sub-component;
preloading requested data on the remote server by a first come first serve (FCFS) scheme;
upon retrieving the requested data from the remote server by the FCFS scheme, pre-rendering the retrieved data for the predicted data range in a pre-render window associated with the user interface of the client device;
retrying to retrieve the data range request in response to a failure to retrieve the requested data from the remote server, wherein the failure includes one or more of a network issue and a server time-out;
storing the requested data on a local cache associated with the client device until one of the document or an application associated with the document is closed;
deleting the local cache at predefined time intervals to prevent the local cache from occupying memory on the client device; and
normalizing the requested data by translating at least one of: at least one page number, at least one name, at least one unit, and at least one formatting of the requested data to match a format of the document viewed on the user interface of the client device.

20. The method of claim 19, further comprising:
employing a data loader interface sub-component associated with the data loader component for receiving the data request and facilitating work flow between the request manager sub-component, the LRU sub-component, and the preload predictor sub-component;
exporting the retrieved data to a data-to-layout converter sub-component for reformatting the retrieved data to match a format and layout of the document as it is viewed on the client device; and
employing an exporter sub-component to add stylistic information to the retrieved data including one or more of page numbers and page breaks before pre-rendering the retrieved data.

* * * * *